United States Patent
Clute et al.

(10) Patent No.: US 7,628,349 B2
(45) Date of Patent: Dec. 8, 2009

(54) INERTIA ACTUATOR FOR SEAT BELT RETRACTOR

(75) Inventors: Gunter K. Clute, Bloomfield Hills, MI (US); Jennifer Grove, White Lake, MI (US)

(73) Assignee: Autoliv ASP, Inc., Ogden, UT (US)

(*) Notice: Subject to any disclaimer, the term of this patent is extended or adjusted under 35 U.S.C. 154(b) by 31 days.

(21) Appl. No.: 11/714,399

(22) Filed: Mar. 6, 2007

(65) Prior Publication Data

US 2008/0217457 A1    Sep. 11, 2008

(51) Int. Cl.
*B65H 75/48* (2006.01)
*B65H 75/30* (2006.01)
*B60R 22/00* (2006.01)
*B60R 22/46* (2006.01)

(52) U.S. Cl. ............. 242/378.4; 242/384.5; 297/478; 297/480; 297/483; 280/806; 280/808; 180/268

(58) Field of Classification Search ............. 242/378.4, 242/384.5, 384.2; 280/806, 802, 808; 297/478, 297/480, 483; 180/268
See application file for complete search history.

(56) References Cited

U.S. PATENT DOCUMENTS

| | | | |
|---|---|---|---|
| 3,758,044 A | 9/1973 | Nilsson | |
| 3,901,459 A | 8/1975 | Romanzi et al. | |
| 4,135,683 A * | 1/1979 | Stephenson et al. | 242/378.4 |
| 4,164,336 A * | 8/1979 | Higbee et al. | 242/378.4 |
| 4,262,858 A | 4/1981 | Takada | |
| 4,314,680 A * | 2/1982 | Takada | 242/384 |
| 4,391,420 A * | 7/1983 | Ahad et al. | 242/378.4 |
| 4,399,955 A * | 8/1983 | Miskowicz et al. | 242/378.4 |
| 4,420,127 A * | 12/1983 | Kondziola et al. | 242/378.4 |
| 4,458,920 A | 7/1984 | Ozaki | |
| 4,470,556 A * | 9/1984 | Matsuoka | 242/378.4 |
| 4,879,906 A | 11/1989 | Meline et al. | |
| 4,915,411 A | 4/1990 | Norton | |
| 4,936,601 A | 6/1990 | Tada | |
| 5,271,639 A | 12/1993 | Nishizawa | |
| 5,388,464 A | 2/1995 | Maddison | |
| 5,526,996 A | 6/1996 | Ebner et al. | |
| 5,562,269 A | 10/1996 | Protz, Jr. | |
| 5,622,327 A | 4/1997 | Heath et al. | |
| 5,622,383 A | 4/1997 | Kielwein et al. | |
| 5,636,807 A | 6/1997 | Warrick | |
| 5,687,926 A | 11/1997 | Park et al. | |
| 5,848,758 A | 12/1998 | Ernst | |

(Continued)

FOREIGN PATENT DOCUMENTS

EP    0 761 513    5/2000

(Continued)

*Primary Examiner*—John Q. Nguyen
*Assistant Examiner*—Stefan Kruer
(74) *Attorney, Agent, or Firm*—Sally J Brown; Brinks Hofer Gilson & Lione (57) ABSTRACT

An inertia sensitive actuator especially adapted for use with a dual spool retractor for a motor vehicle seat belt system, The dual spool retractor includes shoulder belt and lap belt spool assemblies engaging with the shoulder belt and lap belt portions of the seat belt webbing, The dual spool retractor incorporates an inertia sensitive actuator having an excitation mass which is coupled with both of the retractor spool assemblies via linkages,

12 Claims, 5 Drawing Sheets

U.S. PATENT DOCUMENTS

| | | |
|---|---|---|
| 5,882,084 A | 3/1999 | Verellen et al. |
| 6,139,053 A | 10/2000 | Knox |
| 6,164,581 A * | 12/2000 | Freeman et al. .......... 242/384.4 |
| 6,230,997 B1 * | 5/2001 | Palliser .................... 242/384.4 |
| 6,299,093 B1 | 10/2001 | Harte et al. |
| 6,386,472 B1 * | 5/2002 | Rogers, Jr. .................. 242/384 |
| 6,435,442 B1 | 8/2002 | Kielwein et al. |
| 6,547,175 B2 | 4/2003 | Kielwein et al. |
| 6,647,788 B2 | 11/2003 | Murai et al. |
| 6,802,470 B2 | 10/2004 | Smithson et al. |

FOREIGN PATENT DOCUMENTS

| | | |
|---|---|---|
| GB | 2 157 045 | 10/1985 |

* cited by examiner

INERTIA ACTUATOR FOR SEAT BELT RETRACTOR

FIELD OF THE INVENTION

This invention relates to automotive safety restraint systems and, in particular, to an inertia sensitive actuator for locking a seat belt retractor spool in response to inertial forces.

BACKGROUND OF THE INVENTION

Numerous designs of passive and active automotive occupant restraint systems are known for enhancing occupant protection in the event of a vehicle impact. Passive systems such as inflatable restraints or air bags for frontal and side impacts and automatically deployed seat belt systems are known. Active seat belt systems have been used for many decades and are manually deployed by the occupant. The conventional seat belt system uses three points of connection with the vehicle structure and incorporates a lap belt section for engaging the occupant's lower torso, and a shoulder belt section for engaging the occupant's upper torso. When used, the seat belt restrains movement of the occupant in the event of a vehicle impact or rollover event. In order to enhance the comfort and convenience provided by the seat belt system, retractors are used which permit the belt webbing to be extracted from and retracted into the retractor, allowing movement of the occupant while maintaining the belt in close contact with the occupant. An inertia sensitive actuator may be used to lock the retractor spool when an impact or rollover event is detected, preventing further extraction of webbing to restrain the occupant.

Various approaches have been proposed to efficiently package the vehicle retractor assemblies. One approach utilizes a pair of seat belt retractors, one having a spool for winding and storing the lap belt portion of the webbing, and a second retractor for winding and stowing the shoulder belt portion of the webbing. Dual retractor systems are provided in certain vehicles to provide enhanced comfort and convenience for the vehicle occupants, and provides them with greater freedom of movement. This system is more widely used in luxury vehicles where the additional costs for the benefits of a dual retractor system are acceptable.

Dual retractor systems may also be used in conjunction with so-called inflatable belt systems. An inflatable seat belt system incorporates a section of the shoulder belt which has a bladder or tube which is inflated by a gas, typically by a pyrotechnic inflator, to increase its size and volume. Thus, when an inflatable seat belt is deployed, the normally narrow seat belt webbing expands significantly to reduce the contact pressure between the shoulder belt and the occupant during an impact event. Inflatable seat belts also act as a belt pretensioner by reducing belt slack. Inflatable seat belts are typically deployed using the crash sensing systems also used to deploy other inflatable restraint systems upon the detection of a vehicle impact or rollover event having predetermined dynamic characteristics.

Providing dual retractors for the seat occupants increases the cost and complexity of the restraint system. Further compounding the cost duplication of a dual retractor system is the emergence of an increasing number of sophisticated control systems for retractors. An example of such a control system is a retractor pretensioner. Retractor pretensioners cinch the seat belt webbing against the occupant, eliminating slack immediately upon the detection of a vehicle impact. Reducing the slack in the seat belt system enables the occupant's forward motion to quickly engage the seat belt to begin dissipating impact energy.

Another retractor control device presently known are so-called pre-pretensioners. These devices begin to cinch the seat belt webbing against the occupant when an imminent impact is detected but before an actual impact occurs. This detection can be provided using, for example, radar, ultrasonic, or other sensing systems which anticipate a vehicle crash event before actual impact has occurred. The implementation of these retractor control systems further increases the cost of providing such features in a dual retractor system, since these functions may be duplicated for each retractor.

A commonly available retractor control device presently found in automotive seat belt retractors is an inertia sensitive locking device, also referred to as a "vehicle sensitive" inertia actuator or a mechanical sensor. These devices utilize an excitation mass which moves in response to inertial forces or in the event of inclination of the vehicle and causes locking of the seat belt retractor when the vehicle is exposed to such conditions. These devices are provided to allow freedom of movement of the belted occupants, yet lock the retractor when a restraining effect is necessary. Mechanical inertia sensitive actuators have been in widespread use for many years. Various designs of these devices are employed. One type employs a ball mass which is displaced from a neutral nested position to a displaced position. Another design is a so-called "standing man" type which pivots in response to the inertia forces mentioned previously. Still another variation utilizes a hanging pendulum which pivots under inertial forces. In these described devices, some type of mechanical link such as a lever, paddle, or rod arrangement is used, which is acted upon by the excitation mass when it moves from its neutral position to a displaced position, to cause locking of the associated seat belt retractor spool. This can be done by having a lever which contacts the excitation mass to directly engage with ratchet teeth of the retractor spool. In other cases, a so-called servo or slave mechanical system is used in which the excitation mass sensor link moves and causes another set of mechanical couplings to move to a position where they engage the retractor spool ratchet to prevent further extraction of webbing. Another retractor control function which may be provided by an inertial sensitive actuator is a detection or signaling function, in which displacement of the excitation mass results in an electrical signal, used as an input of a vehicle safety system. In the case of a dual spool retractor, it is ordinarily necessary to provide a pair of inertia sensitive actuators, one for each retractor. As mentioned previously, this duplication of components adds cost and complexity to the combined system, and further increases the packaging volume of the retractor.

BRIEF SUMMARY OF THE INVENTION

An inertia sensitive actuator is provided for a seat belt system in accordance with this invention which utilizes a single excitation mass which is used to provide two or more retractor control functions. In one embodiment of the present invention, the inertia sensitive actuator is incorporated into a dual spool retractor. In that implementation, a single excitation mass, when moved, causes locking of both retractor spools. Accordingly, a single excitation mass and associated linkage components are used to provide the function of two separate inertia sensitive actuator devices. This configuration simplifies the construction and reduces the number of components of the assembly. By positioning the inertia sensitive actuator between the spools of a dual spool retractor, packaging benefits are also realized. In a typical dual retractor device which would employ one spool mounted over the other in a vertical direction, an inertia sensitive actuator can be positioned between them. This enables the overall height of the retractor frame to be maintained in a compact form.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
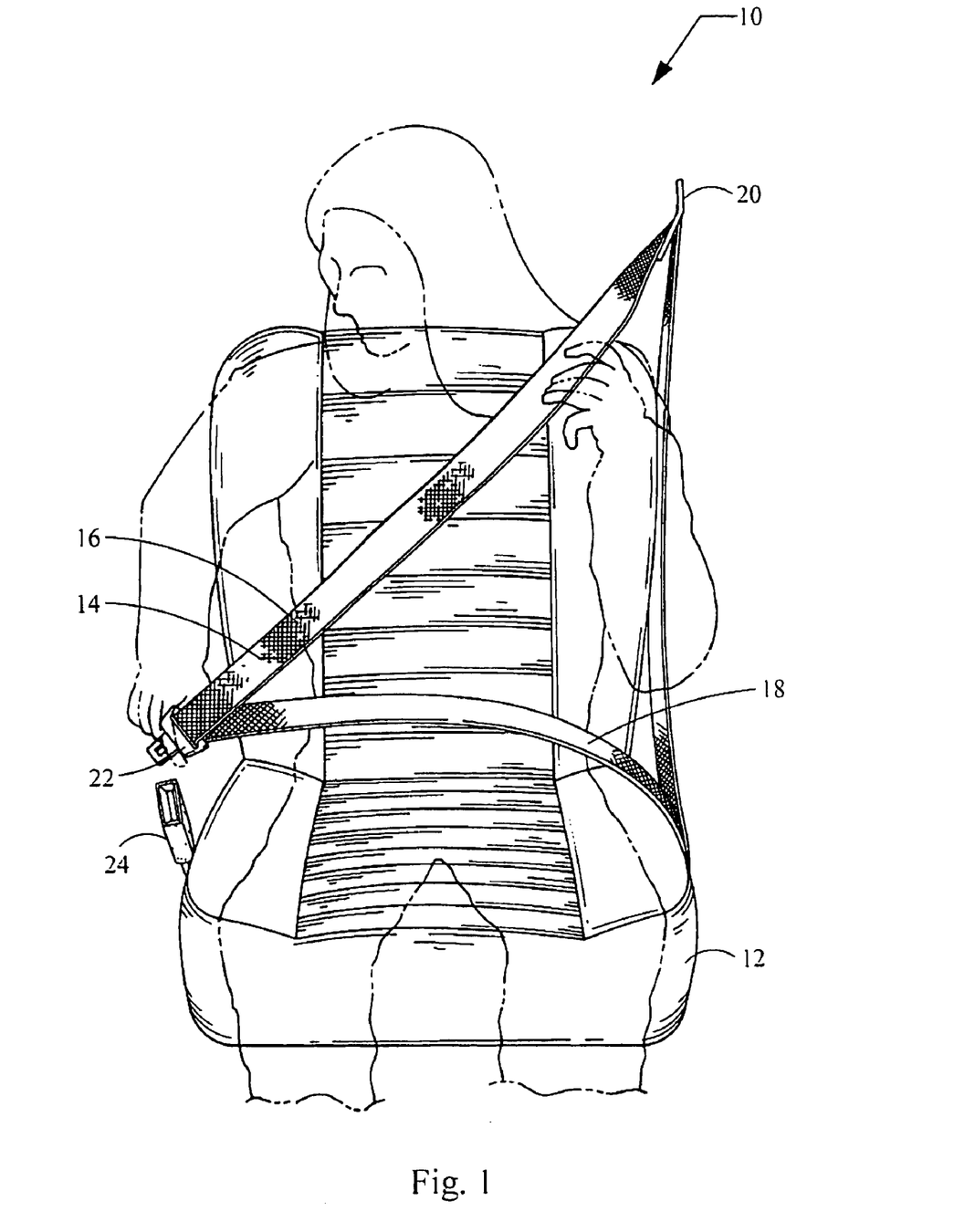
FIG. 1 is a diagrammatic view of a motor vehicle occupant using a three-point manual belt system which may be used with the dual spool retractor assembly having features of the present invention.

With reference to FIG. 1, seat belt system 10 is shown installed for protecting an occupant seated in vehicle seat 12. Seat belt system 10 principally comprises webbing 14 which is divided into an upper webbing portion forming the shoulder belt 16, and a lower webbing portion forming a lap belt 18. The shoulder belt 16 passes around a "D" ring 20 which is typically mounted to the "B" pillar of the motor vehicle (the vertical structural member separating the front and rear doors of a four-door vehicle). Seat belt latch plate 22 is attached to the seat belt webbing 14 and is received by seat buckle 24 which is mounted to the vehicle floor pan or the seat cushion frame. Since system 10 utilizes a dual spool retractor, seat belt latch plate 22 is fixed to the ends of shoulder belt 16 and lap belt 18 (single spool retractor systems use a sliding latch plate).

Figure 2:
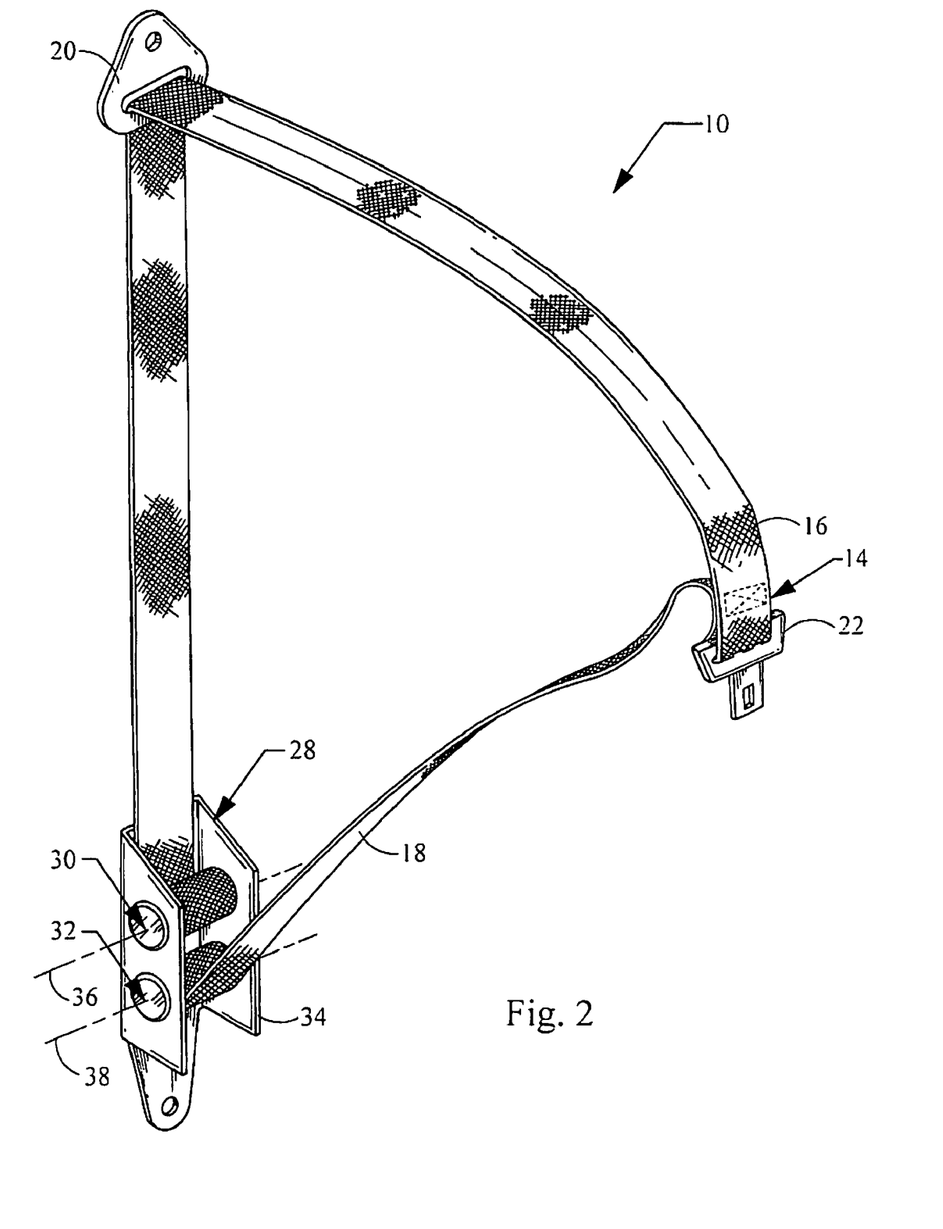
FIG. 2 is a diagrammatic view of a dual spool retractor assembly in accordance with the present invention illustrating additional components of the system.

Now with particular reference to FIG. 2, a diagrammatic view of the system of this invention is illustrated disassociated from the motor vehicle. This figure differs from FIG. 1 also in that it illustrates the same system, but on the front seat passenger side of the vehicle. FIG. 2 illustrates diagrammatically dual spool retractor assembly 28. Retractor 28 is preferably mounted behind trim panels within the "B" pillar of the motor vehicle. Dual spool retractor 28 includes an upper or shoulder belt spool 30, and a lower or lap belt spool 32, both mounted to a common retractor frame 34. Shoulder belt spool 30 is connected with and stows the belt webbing of the shoulder belt 16, whereas the lap belt spool 32 is connected with and stores the lap belt 18 section of the webbing. The vertically extending portion of shoulder belt 16 extending from shoulder belt spool 30 and wrapping around D-ring 20 is preferably positioned behind a vehicle trim panel on the B-pillar. It is also possible to implement the present invention in a so-called integrated structural seat application in which the dual spool retractor 28, D-ring 20, and the anchorage for buckle 24 are directly carried by the structure of seat 12.

Figure 3:
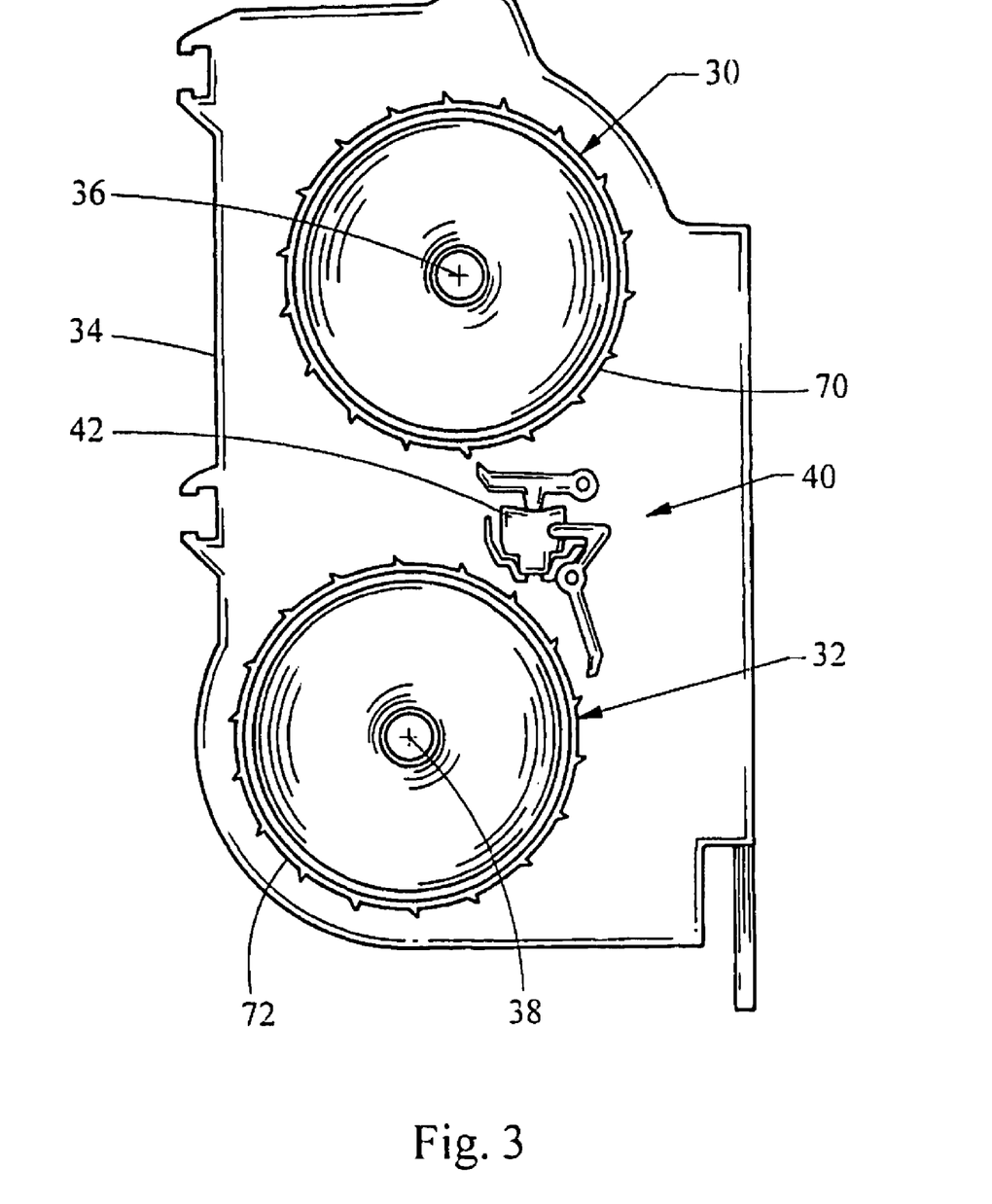
FIG. 3 is a side view of a dual spool retractor assembly in accordance with this invention.
Figure 4:
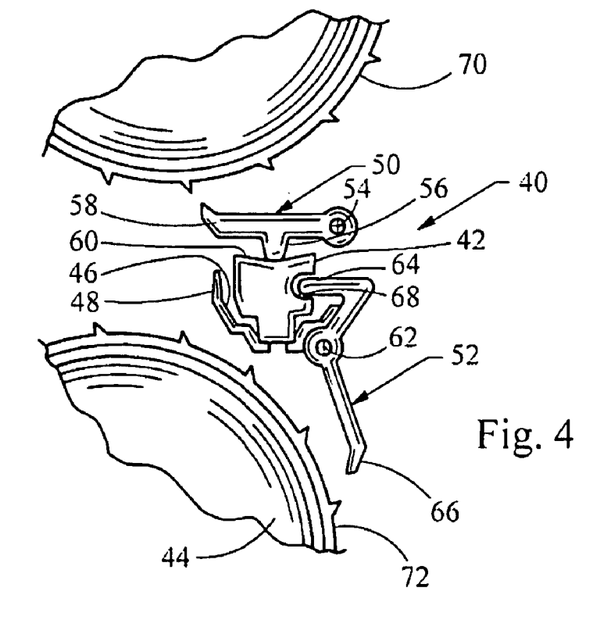
FIG. 4 is a partial side view of the inertia sensitive actuator in accordance with an embodiment of this invention which is an enlarged view taken from FIG. 3 showing the excitation mass in a neutral position.
Figure 5:
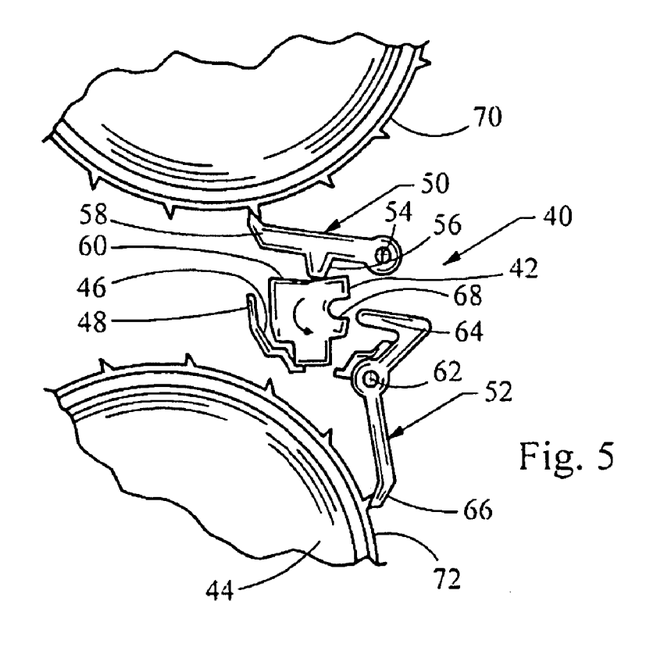
FIG. 5 is a partial side view similar to FIG. 4 but showing the excitation mass in a displaced position.

Additional details of dual spool retractor 28 are provided with reference to FIGS. 3, 4, and 5. Shoulder belt spool 30 includes the shoulder belt 16 webbing and rotates to wind-up or pay-out belt webbing. A torsional "clock" or "motor" type spring is carried within a spring end cap (not shown) and rotationally biases both the spools 30 and 32 to retract the webbing. Similarly, another spring end cap (not shown) is used which incorporates a torsional spring for biasing lap belt spool 32. Spools 30 and 32 may further incorporate other spool control mechanisms which are known in accordance with the prior art, including pretensioners and pre-pretensioners described previously as well as webbing sensitive locking devices or other belt control devices. "Retractor control systems" referred to in this specification describes any system which controls the rotational movement of a webbing spool, thus controlling the extraction and retraction of seat belt webbing or provides another retractor function.

An inertia sensitive actuator is provided for the embodiment of dual spool retractor 28 as described below. Webbing sensitive locking devices may also be provided which sense rapid pay-out of webbing to lock one or more retractor spools. Various electronic sensing mechanisms which detect the withdrawal of webbing and/or the connection of the latch plate 22 to the buckle 24 may also be incorporated into dual spool retractor 28. Both spools 30 and 32 are mounted to a common retractor frame 34.

As shown in FIG. 3, shoulder belt spool 30 is shown oriented vertically above lap belt spool 32. Both are carried by frame 34 and rotate about a generally horizontal axes 36 and 38. An inertia sensitive actuator is provided and is designated by reference number 40. Inertia sensitive actuator 40 is shown in greater detail in FIGS. 4 and 5. Actuator 40 includes a type of excitation mass 42 known in the industry as a "standing man" type. This type of excitation mass operates by pivoting from its resting or neutral position, shown in FIGS. 3, and 4, in which its axis 44 is generally vertical as shown in FIG. 4, to a displaced position tipped about its bottom surface within a nest surface formed by housing 48, as shown in FIG. 5. Inertia sensitive actuator 40 includes a linkage in the form of a pair of levers, including upper sensor lever 50 and lower sensor lever 52. As shown, upper sensor lever 50 can rotate about pivot 54 and includes a downwardly projecting mass engaging finger 56 and an extending spool locking finger 58. Mass engaging finger 56 rests on the upper concave surface 60 of excitation mass 42. In an analogous manner, lower sensor lever 52 can rotate about pivot 62 and includes mass engaging finger 64 and spool locking finger 66. Mass engaging finger 64 rests within excitation mass notch 68.

In the event that retractor 28 is exposed to inertial forces associated with a deceleration of the associated motor vehicle, excitation mass 42 is caused to be displaced to a tipped position, with one possible tipped position shown in FIG. 5. When this occurs, the interaction of mass engaging finger 56 of upper sensor level 50 causes that lever to rotate in a clockwise direction. Similarly, the engagement between mass engagement finger 64 of lower sensor lever 52 causes that lever to also rotate in a clockwise direction. This motion of levers 50 and 52 causes their associated spool locking fingers 58 and 66 to engage with ratchet wheels 70 and 72 fixed to the ends of the upper and lower spools 30 and 32, respectively. This engagement prevents further rotation of the spools and thus controls extraction of webbing 14 from both the spools.

A significant benefit of the dual spool retractor 28 in accordance with this invention is the central positioning of inertia sensitive actuator 40. As best illustrated in FIG. 3, actuator 40 is positioned generally between the two spools in the vertical direction. This enables the overall height of retractor frame 34 to be maintained in a compact configuration.

Figure 6:
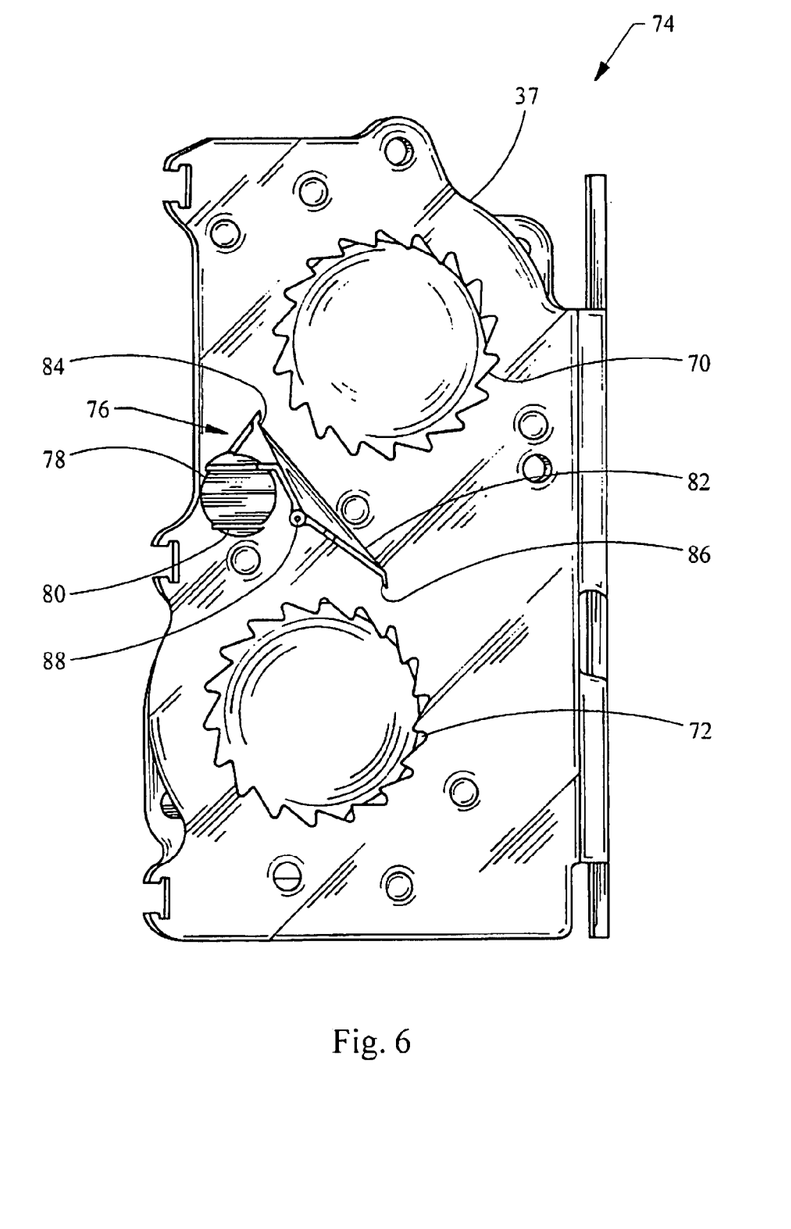
FIG. 6 is a side view of an inertia sensitive actuator in accordance with a second embodiment of the invention.

FIG. 6 illustrates a dual spool retractor assembly 74 including an inertia sensitive actuator 76 in accordance with a second embodiment of this invention. Dual spool retractor 74 includes many elements common with retractor 28 described previously. Common elements between retractors 28 and 74 are identified by like reference numbers and a description of those common elements has been provided previously.

Inertia sensitive actuator 76 illustrated in FIG. 6 incorporates an excitation mass 78 in the form of a metal sphere or ball. Mass 78 is nested within concave shaped nest 80 of the actuator housing. Inertia sensitive actuator 76 incorporates single sensor lever 82 which is capable of locking engagement with ratchet wheels 70 and 72 through spool locking fingers 84 and 86. Sensor lever 82 is rotatable about pivot 88. Sensor lever 82 incorporates an inertia mass engaging cup portion 90 which fits over the top surface of excitation mass 78 and closely conforms with its upper contour when the device is not exposed to inertial forces and the mass is in its neutral position.

In the event that dual spool retractor 74 is exposed to inertial loads, excitation mass 78 is urged through the inertial forces to move from its position shown in FIG. 6 to a displaced position which for purposes of illustration could be moved in the left or right hand direction as the elements are illustrated in FIG. 6. When such displacement of excitation mass 78 occurs, the mass rolls up an edge of nest 80 and its interaction with cup 90 causes sensor lever 82 to rotate in the clockwise direction. Such rotation when reaching sufficient magnitude causes locking fingers 84 and 86 to engage with ratchet wheels 70 and 72 in a manner similar to inertia sensitive actuator 40 as described previously. Inertia sensitive actuator 76 of this second embodiment of the invention provides the advantage of fewer moving parts than needed for inertia sensitive actuator 40 since a single sensor lever 82 engages with both ratchet wheels 70 and 72 rather than having dedicated sensor levers for each of the ratchet wheels. As in the prior embodiment, inertia sensitive actuator 76 incorporates a single excitation mass 78 which provides a locking function for both of the spools of the retractor.

Although a "standing man" type excitation mass 42 and ball type mass 78 are described in this description, other configurations of excitation mass could also be employed without departing from the scope of this invention. In such a configuration, movement of linkage which is sensitive to displacement of the mass is coupled to two or more spool assemblies. A significant feature of this invention is that a single excitation mass is capable of providing multiple retractor control functions. In the embodiment described above, such retractor control functions comprise locking two separate spools from continued rotation and extraction of associated belt webbing. In other configurations within the scope of this invention, one or more levers which contact the excitation mass may be coupled to associated one or more retractor spools through additional mechanical linkages. One approach typically used includes so-called servo or slave-type mechanical configurations in which very low forces are transmitted by the mechanical sensor linkage which contacts the excitation mass which is coupled to structurally more robust elements which directly engage with the retractor sprockets and provide the necessary strength to withstand significant torque loads acting on the retractor spool.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt retractor for a seat belt system comprising:
    a first and a second rotatable spool for storing seat belt webbing and allowing retraction and extraction of the webbing from the retractor, and
    an inertia sensitive actuator wherein the inertia sensitive actuator causes locking of the first and second spools in response to inertial forces acting on the retractor for restricting extraction of the webbing from the retractor, the inertia sensitive actuator having an excitation mass moveable from a neutral position to a displaced position in response to the inertial forces, and a linkage in the form of a first sensor lever and a second sensor lever, the first and second sensor levers contacting the excitation mass and each being mounted for rotation about separate pivot points and responsive to movement of the excitation mass from the neutral position to the displaced position, the first sensor lever coupled with the first spool to cause the locking of the first spool, and the second sensor lever coupled with the second spool to cause locking of the second spool;
    wherein the excitation mass is a standing man type mass which tilts about a pivot point positioned at near a bottom of the mass from a generally vertical neutral position to a tipped displaced position, and the excitation mass engaging with said first and second levers above said pivot point when in the displaced position.

2. A seat belt retractor according to claim 1 wherein the first and second sensor levers each form a mass engaging finger which contacts the excitation mass and is acted on when the excitation mass moves between the neutral and displaced positions.

3. A seat belt retractor according to claim 1 wherein a spool locking finger of the first sensor lever engages with the first spool to cause interference with rotation of the first spool to thereby cause the locking of the first spool.

4. A seat belt retractor according to claim 1 wherein a spool locking finger of the second sensor lever engages with the second spool to cause interference with rotation of the second spool to thereby cause the locking of the second spool.

5. A seat belt retractor according to claim 1 wherein the first sensor lever having first locking finger engageable with the first spool and the second sensor lever having a second locking finger engageable with the second spool to thereby cause interference with rotation of the first and second spools.

6. A seat belt retractor according to claim 1 wherein the retractor further comprises a frame with the first and the second spools mounted to the frame for rotation about generally horizontal axes and the first and the second spools are oriented in a generally vertically stacked arrangement and wherein the excitation mass is located vertically generally between the first and the second spools.

7. A seat belt retractor for seat belt webbing of a seat belt system, the retractor assembly comprising;
    a first and a second rotatable spool for storing the webbing and allowing retraction and extraction of webbing from the retractor,
    an inertia sensitive actuator causes locking of the first and second spools in response to inertial forces acting on the retractor assembly for restricting extraction of the webbing from the retractor, the inertia sensitive actuator having an excitation mass moveable from a neutral position to a displaced position in response to the inertial forces, a retractor frame with the first and the second spools mounted to the frame for rotation about generally horizontal axes and the first and the second spools are oriented in a generally vertically stacked arrangement and wherein the excitation mass is located vertically generally between the first and the second spools, and a linkage in the form of a first sensor lever and a second sensor lever, the first and second sensor levers contacting the excitation mass and each being mounted for rotation about separate pivot points and responsive to movement of the excitation mass from the neutral position to the displaced position, the first sensor lever coupled with the first spool to cause locking of the first spool and the second sensor lever coupled with the second spool to cause the locking of the second spool;

wherein the excitation mass of the inertia sensitive actuator is a standing man type mass which tilts about a pivot point positioned at near a bottom of the mass from a generally vertical neutral position to a tipped displaced position, and the excitation mass engaging with said first and second levers above said pivot point when in the displaced position.

8. A seat belt retractor according to claim 7 wherein the first and second sensor levers each form a mass engaging finger which is acted on when the excitation mass moves between the neutral and displaced positions.

9. A seat belt retractor according to claim 7 wherein the first sensor lever contacts the excitation mass and is mounted for rotation in response to movement of the excitation mass to the displaced position.

10. A seat belt retractor claim 7 wherein a spool locking finger of the second sensor lever engages with the second spool to cause interference with rotation of the second spool to thereby cause the locking of the second spool.

11. A seat belt retractor according to claim 7 wherein the first sensor lever having a first spool locking finger engageable with the first spool and the second sensor lever having a second locking finger engageable with the second spool to cause interference with rotation of the first and second spools to thereby cause the locking of the first and second spools.

12. A seat belt retractor according to claim 9 wherein a spool locking finger of the first sensor lever engages with the first spool to cause interference with rotation of the first spool to thereby cause the locking of the first spool.

* * * * *